(12) United States Patent
Lee

(10) Patent No.: US 7,428,133 B2
(45) Date of Patent: Sep. 23, 2008

(54) PROTECTION DEVICE OF A SURGE PROTECTOR

(75) Inventor: Yu-Lung Lee, Banciao (TW)

(73) Assignee: Powertech Industrial Co., Ltd., Taipei County (TW)

( * ) Notice: Subject to any disclaimer, the term of this patent is extended or adjusted under 35 U.S.C. 154(b) by 0 days.

(21) Appl. No.: 11/256,082

(22) Filed: Oct. 24, 2005

(65) Prior Publication Data

US 2006/0279892 A1    Dec. 14, 2006

(30) Foreign Application Priority Data

Jun. 9, 2005    (TW) ............................... 94215302 U

(51) Int. Cl.
| | |
|---|---|
| H02H 5/04 | (2006.01) |
| H02H 3/00 | (2006.01) |
| H02H 7/00 | (2006.01) |
| H02H 9/02 | (2006.01) |
| H02H 3/08 | (2006.01) |
| H02H 9/08 | (2006.01) |
| H02H 9/00 | (2006.01) |

(52) U.S. Cl. ..................... 361/103; 361/104; 361/100; 361/93.1; 361/93.9; 361/18

(58) Field of Classification Search ................ 361/103, 361/104

See application file for complete search history.

(56) References Cited

U.S. PATENT DOCUMENTS 6,476,618 B1 *   11/2002   Chou ......................... 324/550
6,927,963 B2 *   8/2005    Potter, IV ................... 361/104

* cited by examiner

*Primary Examiner*—Michael Sherry
*Assistant Examiner*—Dharti H Patel
(74) *Attorney, Agent, or Firm*—Troxell Law Office, PLLC

(57) ABSTRACT

The present invention relates to an protection device of a surge protector, which comprises: a first fuse; a resistor; a switching circuit; a second fuse; and a surge protector; thereby the switching circuit can be turned ON and make the resistor be heated when the sensing end senses a low potential, and then makes the first fuse be opened due to sense heat, so as to cut off the power source.

7 Claims, 1 Drawing Sheet

PROTECTION DEVICE OF A SURGE PROTECTOR

REARGROUND OF THE INVENTION

1. Field of the Invention

Figure 1:
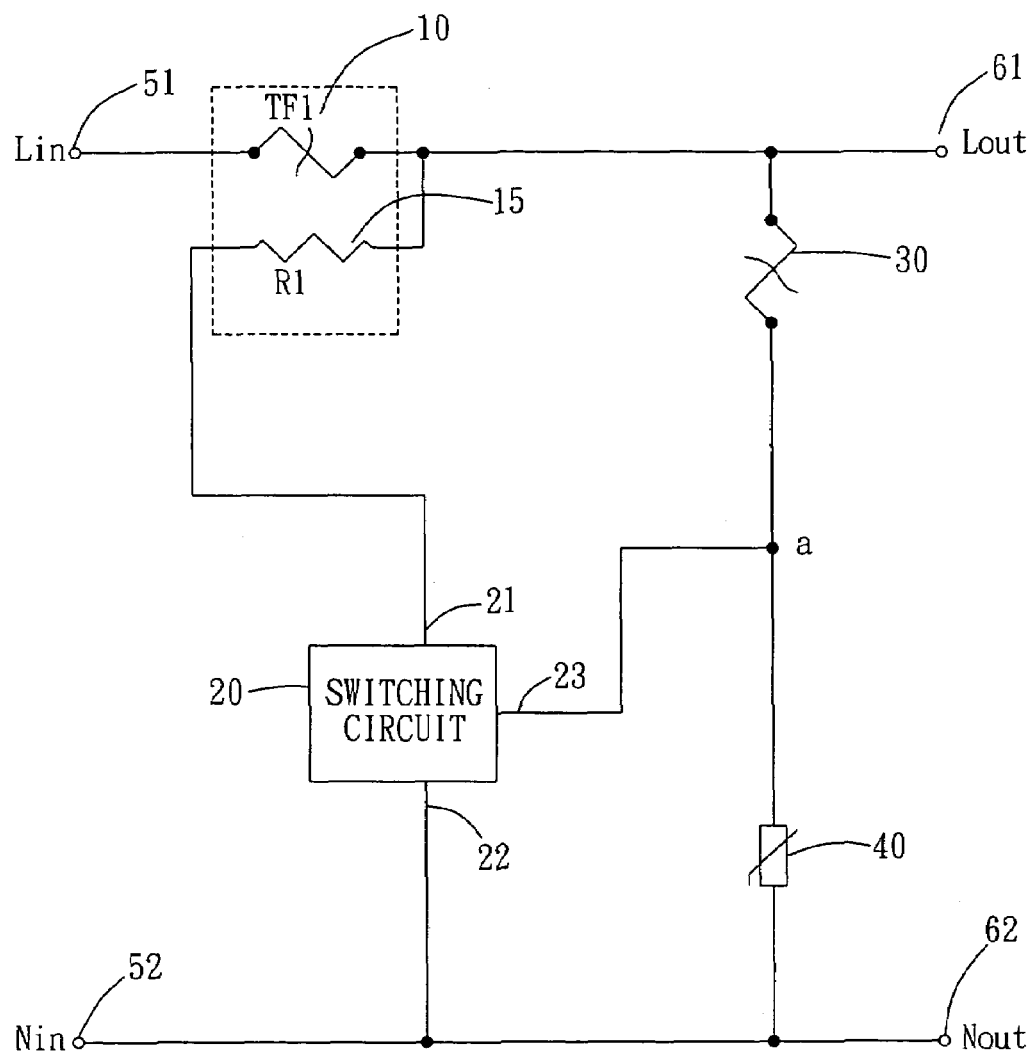

The present invention relates to a protection device of a surge protector, more particularly, it relates to a protection device of a surge protector which can automatically cut off the power by using a switching circuit to drive a resistor being heated when the surge protector failed, so as to achieve the goal of automatically cut off the power source.

2. Description of the Related Art

In general, the prior art power outlet with surge protector normally used metal oxide varistors (MOV) or other transient/surge protector to stop the surge form being generated. However, the metal oxide varistors (MOV) or transient/surge protector would be heated due to absorbing heat form the surge, and it would cause a short circuit phenomena when it absorbed a huge surge and could not endure anymore; therefore, the prior art surge protector used a temperature fuse or current fuse to prevent the abnormal situation form being generated.

However, the surge protector would be aged and break down and lose its protecting function after long-term absorbing the surge. The general surge protector normally used an indicator or a buzzer to notify the user that the surge protector had lost its function. But, the electrical equipment(s) plugged into the power outlet with surge protector would pose a potential danger when the surge protector had lost its function and still being used.

At present, most surge protectors will be heated and burn the temperature fuse so as to achieve the goal of automatically cutting off the power source. However, when the surge protectors endure a huge current surge and they can not cut off the power source, thus the surge protectors with such structure can not effectively achieve the goal of preventing the backend equipment(s) form being damaged.

There is therefore a need for a new and improved strategy and technique of a protection device of a surge protector for overcoming these deficiencies and the present invention overcomes these deficiencies in a new and novel fashion.

SUMMARY OF THE INVENTION

According to one aspect of the present invention, the present invention provides a protection device of a surge protector, which can automatically cut off the power by using a switching circuit to drive a resistor being heated when the surge protector failed, so as to achieve the goal of automatically cut off the power source.

According to another aspect of the present invention, the present invention provides a protection device of a surge protector, which can effectively and automatically cut off the power of the surge protector when the surge protector is abnormally under various bad conditions, so as to achieve the goal of protecting the backend equipment(s).

For reaching the aforesaid object, wherein, the protection device of a surge protector, which comprises: a first fuse, wherein one end of the first fuse is coupled to a first power input end, and another end of the first fuse is coupled to a first power output end; a resistor, wherein one end of the resistor is coupled to an output end of the first fuse; a switching circuit, further comprising a first end, a second end and a sensing end, wherein the first end is coupled to the resistor and the second end is coupled to a second power output end; a second fuse, wherein one end of the second fuse is coupled to the first power output end, and another end of the second fuse is coupled to the sensing end; and a surge protector, wherein one end of the surge protector is coupled to the sensing end and the second fuse, and another end of the surge protector is coupled to a second power output end; thereby the switching circuit can be turned ON and make the resistor be heated when the sensing end senses a low potential, and then makes the first fuse be opened due to sense heat, so as to cut off the power source.

BRIEF DESCRIPTION OF THE DRAWING PORTIONS

FIG. 1 shows a perspective view of a protection device of a surge protector according to one embodiment of the present invention.

DETAILED DESCRIPTION OF THE PREFERRED EMBODIMENT

Referring to FIG. 1, which shows a perspective view of a protection device of a surge protector according to one embodiment of the present invention; As shown in the Fig. the protection device of a surge protector of the present invention mainly comprises: a first fuse 10; a resistor 15; a switching circuit 20; a second fuse 30; and a surge protector 40.

Wherein, the first fuse 10 is preferably a temperature fuse for sensing the temperature near the wire(s), wherein one end of the first fuse 10 is coupled to a first power input end 51, and another end of the first fuse 10 is coupled to a first power output end 61, wherein the first power input end 51 is a line input end ($L_{in}$), and the first power output end 61 is a line output end ($L_{out}$).

Wherein one end of the resistor 15 is coupled to an output end of the first fuse 10 and is preferably disposed near the first fuse 10, for example but not limited to be formed integrally with the first fuse 10, so as to sense the temperature near the first fuse 10.

The switching circuit 20, for example but not limited to a transistor circuit, further comprises a first end 21, a second end 22 and a sensing end 23, wherein the first end 21 is coupled to the resistor 15 and the second end 22 is coupled to a second power output end 52 ($N_{in}$), and the sensing end 23 is coupled to the second fuse 30 and the surge protector 40 for sensing the potential level of the point "a" (please refer to FIG. 1). The switching circuit 20 will become an open status when the potential level of the point "a" is high, and the switching circuit 20 will become a short status when the potential level of the point "a" is low.

Wherein one end of the second fuse 30 is coupled to the first power output end 51, and another end of the second fuse 30 is coupled to the sensing end 23. Wherein, the second fuse 30 is a temperature fuse or a current fuse; and the second power output end 62 is a neutral output end ($N_{out}$).

Wherein one end of the surge protector 40 is coupled to the sensing end 23 and the second fuse 30, and another end of the surge protector 40 is coupled to a second power output end 62; wherein, the surge protector 40 is for example but not limited to a metal oxide varistors (MOV) or other transient/surge protectors, so as to prevent the surge from being generated.

When the protection device of a surge protector of the present invention is assembled completely, firstly, the potential level of the point "a" remains high when the surge protector 40 works normally, and the switching circuit 20 is become an open status, thus there is no current flows through the resistor 15, therefore, the temperature of the resistor 15 will remain low and the first fuse 10 also remains at normal status, therefore ,the input power can be normally supplied to the power output ends 61, 62.

The potential level of the point "a" will become low when the surge protector 40 becomes abnormal, for example abnormally heated or over current passed through it, and the second fuse 30 will be actuated due to being over heated or over current, so the potential level of point "a" will become low and the switching circuit 20 will become a short status, thus the current will flow through the resistor 15 and heat the resistor 15, furthermore, the first fuse 10 will be actuated (that is, becomes an open status), therefore ,the input power will be cut off and can not be supplied to the power output ends 61, 62.

Therefore, the protection device of a surge protector of the present invention can effectively and automatically cut off the power when the surge protector 40 is abnormally under various bad conditions (such as abnormally heated or over-load current passed through it), so as to achieve the goal of protecting the backend equipment(s), such that the protection device of a surge protector of the prevent invention can overcome the drawbacks of the prior art surge protectors.

According to the above description, the protection device of a surge protector of the present invention can effectively and automatically cut off the power when the surge protector 40 is abnormally under various bad conditions, so as to achieve the goal of protecting the backend equipment(s), therefore, the protection device of a surge protector of the prevent invention can overcome the drawbacks of the prior art surge protectors.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A protective device of a surge protector comprising:
   a) a resistor having a resistor first end and a resistor second end;
   b) a first fuse having a first fuse first end electrically connected to a first power input end and a first fuse second end electrically connected to the resistor second end and a first power output end;
   c) a switching circuit is a transistor circuit having a switching circuit first end, a switching circuit second end, and a sensing end, the switching circuit first end is electrically connected to the resistor first end, the switching circuit second end is electrically connected to a second power output end;
   d) a surge protector having a surge protector first end and a surge protector second end, the surge protector first end is electrically connected to the second power output end; and
   e) a second fuse having a second fuse first end electrically connected directly to the first power output end, the resistor second end, and the first fuse second end, and a second fuse second end electrically connected to the surge protector second end and sensing end of the switching circuit, wherein when the sensing end senses a low potential, the switching circuit is turned on heating the resistor and opening the first fuse thereby cutting off a power source, wherein the surge protector and the second fuse are connected in series between the first power output end and the second power output end.

2. The protective device according to claim 1, wherein the first fuse is a temperature fuse.

3. The protective device according to claim 1, wherein the second fuse is selected from a group consisting of a temperature fuse and a current fuse.

4. The protective device according to claim 1, wherein the first power input end is a line input end, and the second power input end is a neutral input end.

5. The protective device according to claim 1, wherein the first power output end is a line output end, and the second power output end is a neutral output end.

6. The protective device according to claim 1, wherein the surge protector is a metal oxide varistor.

7. The protective device according to claim 1, wherein the resistor sensing a temperature of the first fuse.

* * * * *